United States Patent
Henson et al.

(10) Patent No.: US 12,423,973 B2
(45) Date of Patent: Sep. 23, 2025

(54) DEVICE AND COMPUTER IMPLEMENTED METHOD FOR EXPLAINABLE SCENE CLUSTERING

(71) Applicant: Robert Bosch GmbH, Stuttgart (DE)

(72) Inventors: Cory Henson, Pittsburgh, PA (US); Daria Stepanova, Leonberg (DE); Mohamed Gad-Elrab, Saarbruecken (DE); Ruwan Wickramarachchige Don, Columbia, SC (US); Sreyasi Nag Chowdhury, Saarbruecken (DE)

(73) Assignee: ROBERT BOSCH GMBH, Stuttgart (DE)

( * ) Notice: Subject to any disclaimer, the term of this patent is extended or adjusted under 35 U.S.C. 154(b) by 408 days.

(21) Appl. No.: 17/939,517

(22) Filed: Sep. 7, 2022

(65) Prior Publication Data
US 2023/0097860 A1 Mar. 30, 2023

(30) Foreign Application Priority Data
Sep. 28, 2021 (DE) ............... 10 2021 210 848.2

(51) Int. Cl.
*G06K 9/00* (2022.01)
*G06N 5/022* (2023.01)
(Continued)

(52) U.S. Cl.
CPC ............ *G06V 20/41* (2022.01); *G06N 5/022* (2013.01); *G06V 20/58* (2022.01)

(58) Field of Classification Search
CPC ......... G06V 20/41; G06V 20/58; G06N 5/022
See application file for complete search history.

(56) References Cited

U.S. PATENT DOCUMENTS 10,949,718 B2 * 3/2021 Costabello ....... G06V 30/19173
11,475,588 B2 * 10/2022 Zhang ................... G06V 20/70
(Continued)

FOREIGN PATENT DOCUMENTS

| CN | 111339834 A | * | 6/2020 | ......... G06K 9/00664 |
| EP | 3557498 A1 | * | 10/2019 | ........... G02B 27/017 |

OTHER PUBLICATIONS

A Human-Like Traffic Scene Understanding System, Zi-Xiang Xia et al., IEEE, Mar. 2021, pp. 6-17 (Year: 2021).*
(Continued)

*Primary Examiner* — Jayesh A Patel
(74) *Attorney, Agent, or Firm* — NORTON ROSE FULBRIGHT US LLP

(57) ABSTRACT

A device and a computer implemented method for explainable clustering of a scene. The method includes determining a first relation that relates a first object class to a second object class, wherein determining the first relation includes determining, depending on the first object class and the second object class, a pair of entities in a first knowledge graph, in particular a commonsense knowledge graph, that represents information about a domain, wherein the pair of entities is related with the first relation in the first knowledge graph, determining a cluster in that the scene belongs depending on the scene and depending on other scenes, determining a second relation that relates the scene with the cluster depending on at least one feature of digital image data representing the scene, determining a rule that maps the first relation to the second relation.

21 Claims, 3 Drawing Sheets

(51) Int. Cl.
*G06V 20/40* (2022.01)
*G06V 20/58* (2022.01)

(56) References Cited

U.S. PATENT DOCUMENTS

| | | | | |
|---|---|---|---|---|
| 11,782,981 | B2* | 10/2023 | Xu | G06F 16/288 |
| | | | | 707/794 |
| 2011/0299770 | A1* | 12/2011 | Vaddadi | G06V 10/757 |
| | | | | 382/165 |
| 2019/0129432 | A1* | 5/2019 | Russell | G06F 18/23 |
| 2020/0356829 | A1* | 11/2020 | Costabello | G06F 40/56 |

OTHER PUBLICATIONS

Improving Object Recognition for Mobile Robots by Leveraging Common-sense Knowledge Bases, Agnese Chiatti et al., Sep. 27 2020, pp. 1-7 (Year: 2020).*
Generating common-sense scene graphs using a knowledge base BERT model, C.J.A. Stewe et al., Jul. 2021, pp. 1-47 (Year: 2021).*
From Images to Sentences through Scene Description Graphs using Commonsense Reasoning and Knowledge, Somak Aditya et al., arXiv, 2015, pp. 1-18 (Year: 2015).*
Bridging Knowledge Graphs to Generate Scene Graphs, Alireza Zareian et al., Springer, 2020, pp. 606-623 (Year: 2020).*

* cited by examiner

DEVICE AND COMPUTER IMPLEMENTED METHOD FOR EXPLAINABLE SCENE CLUSTERING

CROSS REFERENCE

The present application claims the benefit under 35 U.S.C. § 119 of German Patent Application No. DE 10 2021 210 848.2 filed on Sep. 28, 2021, which is expressly incorporated herein by reference in its entirety.

FIELD

The present invention concerns explainable scene clustering.

SUMMARY

According to an example embodiment of the present invention, a computer implemented method for explainable clustering of a scene comprises determining a first relation that relates a first object class to a second object class, wherein determining the first relation comprises determining, depending on the first object class and the second object class, a pair of entities in a first knowledge graph, in particular a commonsense knowledge graph, that represents information about a domain, wherein the pair of entities is related with the first relation in the first knowledge graph, determining a cluster to which the scene belongs depending on the scene and depending on other scenes, determining a second relation that relates the scene with the cluster depending on at least one feature of digital image data representing the scene, determining a rule that maps the first relation to the second relation. The second relation is based on low-level features of the digital image. The first relation explains why the second relation relates the scene to the cluster.

Determining the first relation may comprise determining a first embedding that represents a first entity of the first knowledge graph, determining a second embedding that represents a second entity of the first knowledge graph, determining a third embedding that represents the first object class, determining a fourth embedding that represents the second object class, determining if a similarity between the first embedding and the third embedding and a similarity between the second embedding and the fourth embedding meet a condition, and either determining the pair of entities to comprise the first embedding and the second embedding, if the condition is met or determining the pair of entities depending on at least one other entity of the first knowledge graph. Alphanumeric identifiers, characters or words may identify the entities and/or object classes. The respective embedding may be a text embedding of the alphanumeric identifier, character or word representing the respective entity. For example, synonymous words are automatically detected via their word embeddings.

According to an example embodiment of the present invention, the method may comprise capturing an image comprising the scene, in particular with a camera, in particular a camera mounted to or monitoring a technical system, in particular a vehicle or a road infrastructure, and determining the cluster for the scene and/or determining the rule depending on the image.

According to an example embodiment of the present invention, the method may comprise relating an entity that represents the scene and an entity that represents the cluster, and relating these entities with the second relation in a second knowledge graph, in particular a scene graph.

According to an example embodiment of the present invention, the method may include determining the first relation may comprises relating in the second knowledge graph a first entity that represents the first object class and a second entity that represents the second object class with the first relation.

According to an example embodiment of the present invention, the method may comprise determining the rule that maps the first relation to the second relation, from relations of the second knowledge graph.

According to an example embodiment of the present invention, the method may comprise generating training data, in particular for automated driving, wherein generating training data comprises generating a label for the scene depending on the second relation that relates the scene with the cluster or depending on the rule that maps the first relation to the second relation.

According to an example embodiment of the present invention, the method may comprise generating a data structure for the scene, wherein the data structure comprises a dimension for the second relation, and a dimension for the rule.

According to an example embodiment of the present invention, the method may comprise in response to a conjunctive query, in particular from a controller of a technical system, executing a semantic search for a result of the conjunctive query over rules that are determined for a set of clusters including the cluster, and controlling the technical system with the controller depending on the result.

According to an example embodiment of the present invention, a device for explainable scene clustering is configured in particular with at least one processor and at least one storage to execute the method.

According to an example embodiment of the present invention, the device may comprise a controller and is configured to executed the method for controlling the technical system with the controller.

According to an example embodiment of the present invention, a computer program comprises computer readable instructions, that, when executed on a computer, cause the computer to execute steps in the method.

Further advantageous embodiments are derivable from the following description and the figures.

DETAILED DESCRIPTION OF EXAMPLE EMBODIMENTS

Knowledge graphs, KGs, represent interlinked collections of factual information, and may be encoded as a set of triples of the form <subject predicate object>, e.g., <John, lives in, Germany>. Subjects or objects of such triples may be referred to as entities. Predicates may be referred to as relations. The set of triples of a KG can be naturally represented as a directed graph, whose vertices and edges are labeled.

A scene graph, SG, is a KG that describes a scene. A SG may be constructed from scene images by considering automatically detected objects and events as entities, and the relations among them as predicates, e.g. ⟨scene1,includes, car⟩, ⟨moving,has_participant,car⟩. The SG is not limited to only the visual information. The scenes appearing in the images may also have a certain context, e.g. a location where the image was taken, or a temporal relation across captured images.

A commonsense knowledge graph, CKG, is a knowledge graph that stores general knowledge about the everyday world. In the example, the CKG comprises information that humans are expected to possess. An example of such information is ⟨car,has_part,wheels⟩ or ⟨children,play_with, ball⟩. The CKG may be extracted from textual or other sources.

Knowledge graph embedding, KGE, concerns embedding KG entities and relations into continuous vector spaces. More specifically, KGE models may take as input a set of KG triples and aim at mapping the entities and relations into an n-dimensional vector space such that some features reflecting the KG structure are preserved. These features are for example captured by the objective function of the respective embedding model.

Clustering is a task of grouping entities in a knowledge graph into a set of clusters with a high inter-cluster similarity and a low intra-cluster similarity.

Rule induction is the task of learning rules from a KG. Given a KG, the goal of rule induction is to construct a set of rules of the form H←B, where H is an entailed predicate of the form h(X,c), where c is a constant corresponding to a target cluster, B is a conjunction of predicates of the form $b_1(X_1,Y_1), \ldots, b_n(X_n,Y_n)$, where every $X_1, Y_1, \ldots, X_n, Y_n$ can either be a variable or a constant. The rule that is induced holds often enough in the data.

Conjunctive query, CQ, is an expression of the form $b_1(X_1, X_2, \ldots, X_k)$←B or $(X_1, X_2, \ldots, X_k)$←B, where B is the body of the CQ and $X_1, X_2, \ldots, X_k$ are answer variables, i.e., variables, whose positions are responsible for answers to the query.

The information needs formulated by a user in natural language can be translated into such formal conjunctive queries. For example, for a KG storing autonomous driving scenes, a user might be interested in all scenes, on which a car and a train located close to the car are depicted. Formally, such query could be formulated as follows:

$Q(X)$←includes($X;Y$);type($Y$;car);includes($X;Z$);located_near($Y;Z$);type($Z$;train)

Figure 1:
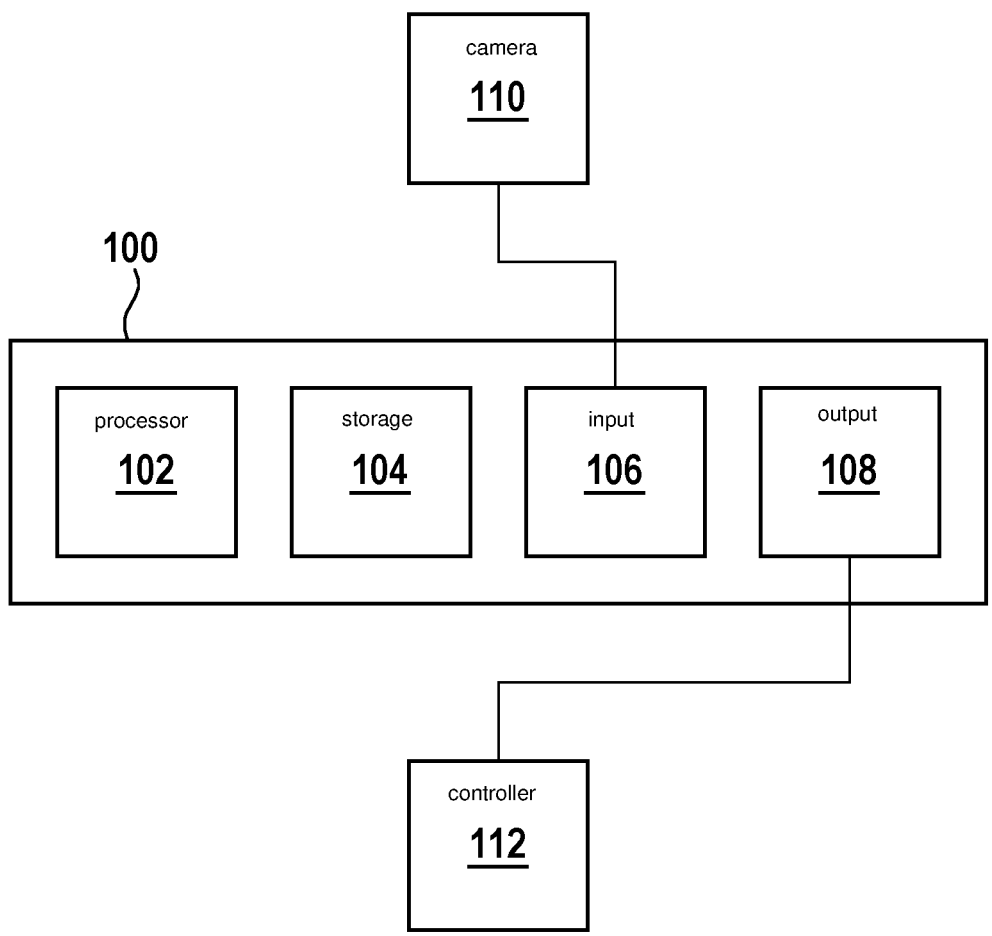
FIG. 1 schematically depicts a device for explainable scene clustering, according to an example embodiment of the present invention.

FIG. 1 depicts a device 100 comprising at least one processor 102 and at least one storage 104 for storing instructions and other data. The device 100 may comprise an input 106 and an output 108.

The input 106 may be configured to receive input. The input may comprise digital images that are captured by at least one camera 110. The input may comprise metadata, e.g. providing a location and/or time of capturing the digital images. The at least one camera may be a camera that is mounted to a vehicle or a road infrastructure.

The output 108 may be configured to output an output. The output may comprise clusters and semantic labels for them. The output 108 may send the output to at least one controller 112 and/or at least one actuator. The at least one controller 112 and/or the at least one actuator may be mounted to the vehicle. The at least one controller 112 and/or the at least one actuator may be configured for at least partially automated driving vehicle. The at least one controller 112 may be configured to control, in response to output received from the output 108, e.g. based on at least one digital image that is captured by the at least one camera, at least one actuator for at least partially automated steering, at least partially automated engine control and/or at least partially automated brake control, e.g. in an at least partially automated driver assistance function, an at least partially automated parking function and/or an at least partially automated collision avoidance function for the vehicle. The vehicle may be a motorcycle, a car, an aircraft, or a vessel.

Figure 2:
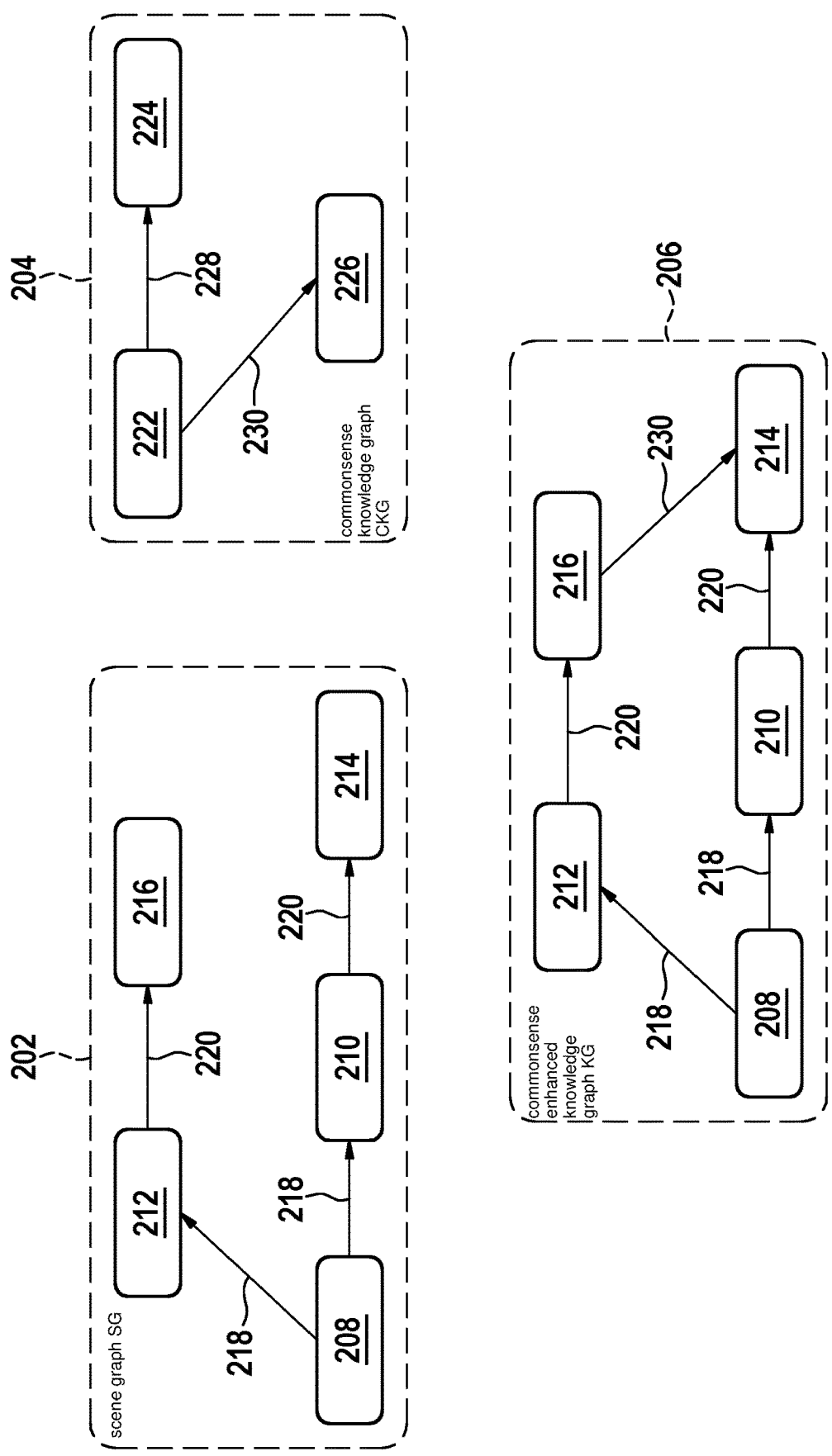
FIG. 2 schematically depicts aspects of enhancing a scene knowledge graph with information from a commonsense knowledge graph, according to an example embodiment of the present invention.

FIG. 2 schematically depicts aspects of enhancing an exemplary SG 202 with information from an exemplary CKG 204. An example for a commonsense enhanced KG 206 is depicted in FIG. 2 as well. In the example, the commonsense enhanced KG 206 is based on the SG 202 and the CKG 204.

The SG 202 comprises a first entity 208. The SG 202 comprises a second entity 210. The SG 202 comprises a third entity 212. The SG 202 comprises a fourth entity 214. The SG 202 comprises a fifth entity 216.

The first entity 208 is related to the second entity 210 with a first relation 218. The first entity 208 is related to the third entity 212 with the first relation 218. The second entity 210 is related to the fourth entity 214 with a second relation 220. The third entity 212 is related to the fifth entity 216 with the second relation 220.

The CKG 204 comprises a first entity 222. The CKG 204 comprises a second entity 224. The CKG 204 comprises a third entity 226. The first entity 222 of the CKG 204 is related to the second entity 224 of the CKG 204 with a third relation 228. The first entity 222 of the CKG 204 is related to the third entity 226 of the CKG 204 with a fourth relation 230. The third relation 228 indicates that a subject entity that relates with the third relation 228 to an object entity is related to the object entity as indicated by the third relation 228. The third relation 228 may indicate any common sense relation. The fourth relation 230 indicates that a subject entity that relates with the fourth relation 230 to an object entity is related to the object entity as indicated by the fourth relation 230. The fourth relation 230 may indicate any common sense relation.

The enhanced KG 206 comprises the SG 202. This means, in the enhanced KG, the first entity 208 is related to the second entity 210 with the first relation 218; the first entity 208 is related to the third entity 212 with the first relation 218; the second entity 210 is related to the fourth entity 214 with the second relation 220; the third entity 212 is related to the fifth entity 216 with the second relation 220.

In addition, the fifth entity 216 is related to the fourth entity 214 with the fourth relation 230.

An example for a digital image comprising a scene with a bicycle and a car is described below.

The first entity 208 of the SG 202 represents the scene. The second entity 210 of the SG 202 represents a first object that is detected in the digital image. The third entity 212 of the SG 202 represents a second object that is detected in the digital image. The fourth entity 212 of the SG 202 represents a first label, e.g., Car. The fifth entity 216 of the SG 202 represents a second label, e.g. Bicycle.

The first relation 218 in this example indicates that an object that is represented by a subject entity and that is related to an object entity by the first relation 218 is in a class that the object entity represents.

The SG 202 in this example indicates that the first object that is detected in the scene is a Car. The SG 202 in the example indicates that the second object that is detected in the scene is a Bicycle.

The first entity 222 of the CKG 204 represents a first common sense information, e.g. automobile. The second entity 224 of the CKG 204 represents a second common sense information e.g. wheel. The third entity 226 of the CKG 204 represents a third common sense information, e.g. bike.

The third relation 228 in the example indicates that an object that is represented by a subject entity and that is related to an object entity by the third relation 228 has a part that is an object that the object entity represents.

The fourth relation 230 in the example indicates how a property of a subject, that a subject entity represents, compares to a property of an object that is represented by the object entity that the subject entity relates to.

The CKG 204 in the example indicates that the automobile has a part that is a wheel. The CKG 204 in the example indicates how the automobile compares to the bike. In the example, the property that is compared is the acceleration. This means that the fourth relation 230 in this example indicates the common sense information that an automobile accelerates faster than a bike.

Figure 3:
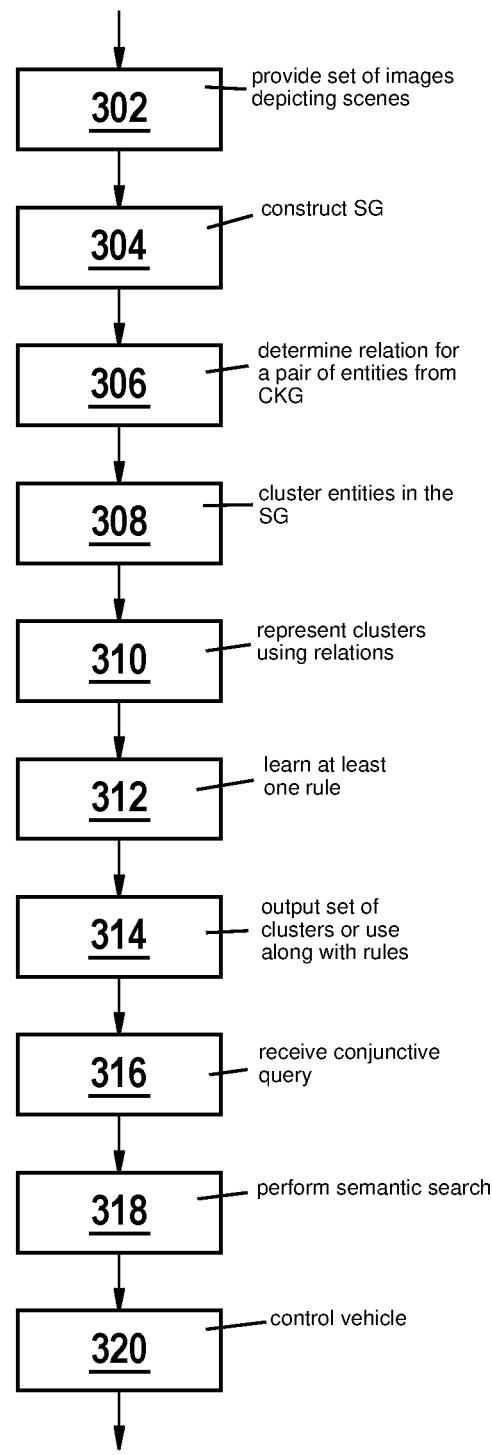
FIG. 3 schematically depicts steps in a method for explainable scene clustering, according of an example embodiment of the present invention.

FIG. 3 schematically depicts steps in a method for explainable scene clustering. The method is based on knowledge graph embeddings, KGEs of the SG 202 and the CKG 204 respectively.

A KGE of the SG 202 comprises vectors in a state space that represent entities of the SG 202. A KGE of the CKG 204 comprises vectors in the state space that represent entities of the CKG 204.

Combining the KGs together, i.e., combining SG and CKG, in the example comprises determining vectors depending on text embeddings of words representing entities, rather than combining KG embeddings. More specifically, synonymous words are automatically detected via their word embeddings.

In the example, a vector for an entity representing a car is closer to a vector for an entity representing an automobile than to a vector for an entity representing a bicycle or to a vector for an entity representing a bike. In the example, the vector for the entity representing the bicycle is closer to the vector for the entity representing the bike that to the vector for the entity representing the automobile and to the vector for the entity representing the car.

The device 100 is adapted for executing a method that is described below with reference to FIG. 3.

The digital images that are processed according to the disclosure herein may be video, radar, LiDAR, ultrasonic, motion, or thermal images, e.g. captured by the camera. The digital images may be processed to cluster scenes and to compute machine and/or human-interpretable labels for the resulting clusters. The digital images may be processed to operate a technical system, e.g. the vehicle, depending on a machine interpretable label of at least one resulting cluster.

The method reduces the problem of scene clustering to a problem of reasoning on graphs. More specifically, instead of relying purely on visual features of scenes, the method exploits along with the scene images also information about the objects appearing in the scenes collected from other sources such as those storing commonsense knowledge.

The clustering of the scenes relies not only on visual commonalities of objects occurring in scenes, but also their semantic properties. The semantic properties may be physical properties of the respective objects.

For example, for a scene that includes a car, and a scene that includes a scooter, visually these two objects are different, but they have a physical property in common, e.g., they both accelerate faster than a bike.

The method is described with reference to these two scenes. In the example, the physical property is commonsense information from a CKG. The CKG in the example represents information about a domain, in particular commonsense knowledge about this domain. Domain in the example refers to properties of traffic infrastructure and traffic participants such as vehicles or persons. The method is applicable to other domains as well.

In the example, the CKG relates an entity representing an automobile to an entity bike with a relation indicating "is faster than". In the example, the CKG relates an entity representing a motorcycle to the entity bike with the relation indicating "is faster than".

The scenes may be clustered based on other commonsense information from the CKG about other properties of other objects as well.

In a step 302, a set of images depicting scenes is provided as input.

The images in the set of images may be captured with the camera.

The input optionally comprises metadata of the images.

The CKG may be read from storage or received as input. The CKG may be mined from a collection of documents or other sources in particular using natural language processing techniques.

Afterwards, a step 304 is executed.

In step 304, a SG is constructed based on the input.

The SG is for example constructed from at least a part of the images in the set of images.

Constructing the SG may comprise assigning at least a part of an image from the set of images to an entity representing a scene in the SG. The method for example comprises detecting the scene in at least part of the image based on low-level features in the image. The method may comprise creating the entity representing the scene in the SG.

The method in the example comprises detecting the scene that includes the car and the scene that includes the scooter.

Constructing the SG may comprise classifying an object. The method may comprise detecting the object in the scene based on low-level features of the at least part of the image. Classifying the object may comprise mapping the object to an object class. The method may comprise providing a set of candidate object classes. The method may comprise classifying the object into an object class from the set of candidate object classes.

Constructing the SG may comprise assigning the object to an entity representing the object in the SG. The method may comprise creating the entity representing the object in the SG.

Constructing the SG may comprise assigning the object class to at least one entity representing the object class in the SG. The method may comprise creating the entity representing the object class in the SG.

Constructing the SG may comprise linking the entity representing the object to the entity representing the object class in the SG. Constructing the SG may comprise linking the entity representing the object to the entity representing the scene.

In one example, a unique entity is created in the SG for each scene that is detected in the at least one image. In one example, a unique entity is created in the SG for each object that is detected in the set of images.

In one example, the method comprises linking entities representing objects in the SG to a plurality of entities or any entity in the SG representing a scene in which the object appears.

In one example, the method comprises linking entities representing objects in the SG to a plurality of entities or any entity in the SG representing an object class in which the object is classified.

In the example a set of object classes, e.g., car, scooter, bike, that is found in the scenes in the set of images are represented as dedicated entities in the SG.

The method in the example comprises detecting an object in the scene that includes the car, classifying this object as car and adding the corresponding relation between an entity that represents this object and an entity that represents the object class "car" in the SG. The method in the example comprises detecting an object in the scene that includes the scooter, classifying this object as scooter and adding the corresponding relation between an entity that represents this object and an entity that represents the object class "scooter" in the SG.

In an example, the objects appearing in the digital images are classified according to the set of object classes.

In one example, entities representing scenes are connected to the entities representing objects via a type relation.

Further metadata of the at least one image may be used for constructing the SG.

The method for example comprises extracting a time at that a scene was captured and/or a location in which a scene was captured from the metadata. The method may comprise assigning in the SG the entity that represents the scene to an entity that represents the time at that the scene was captured. The method may comprise assigning in the SG the entity that represents the scene to an entity that represents the location at that the scene was captured.

The method may comprise assigning in the SG the entity that represents the object in the scene with a relation that represents a mutual spatial relation to an entity that represents another object in the scene. The method for example comprises determining mutual spatial relations among bounding boxes corresponding to objects in a scene. In one example, the method comprises detecting a bounding box corresponding to the object in the at least part of the image comprising the scene in particular depending on low-level features of the at least part of the image. The method may comprise determining the mutual spatial relation between this bounding box and another bounding box that is determined for another object in the at least part of the image.

In the example, the method comprises determining a set of triples wherein a triple comprises a subject entity of the SG, an object entity of the SG and a relation between the subject entity of the SG and the object entity of the SG.

The method comprises determining the triple based on low-level features of the at least part of the image. The method comprises determining the set of triples depending on a plurality of images from the set of images.

Afterwards, a step 306 is executed.

In step 306, a relation for a pair of entities from the CKG is determined depending on the first object class and the second object class.

This means that an entity of the SG is related to another entity of the SG with a relation from the CKG.

Determining the relation from the CKG may comprise determining a first embedding that represents a first entity of the CKG and a second embedding that represents a second entity of the CKG. Determining the relation from the CKG may comprise determining a third embedding, that represents the first object class and a fourth embedding that represents the second object class.

Determining the relation from the CKG may comprise determining, if a similarity between the first embedding and the third embedding and a similarity between the second embedding and the fourth embedding meet a condition, and either determining the pair of entities to comprise the first embedding and the second embedding, if the condition is met or determining the pair of entities depending on at least one other entity of the CKG.

The embeddings may be vectors in the vector space.

In the example, the method comprises determining a triple that comprises two entities of the SG and a relation from the CKG. The method may comprise adding this triple to the SG. In the example, the triple comprising the two entities of the SG and their relation from the CKG are stored in the SG. This means, non-visual knowledge related to objects represented in scenes is integrated into the SG. Instead of storing in the SG, another KG may be determined that comprises the SG and the triple.

The enhancing of the SG is explained below for two exemplary entities of the CKG that relate with the relation from the CKG and for two exemplary entities of the SG. Other pairs of entities of the SG may be related with this relation or other relations from the CKG with the same method.

The method may comprise computing embedding vectors representing entities of the SG in a vector space. The method may comprise computing embedding vectors representing entities of the CKG in the vector space. For example, a KGE for the SG and a KGE for the CKG is determined. These KGEs may comprise vectors of the same dimension.

The method may comprise determining a first vector representing a first entity in the SG. The method may comprise determining a second vector representing a second entity in the SG. The method may comprise determining a third vector representing a first entity in the CKG. The method may comprise determining a fourth vector representing a second entity in the CKG.

In the example, the first entity in the CKG and the second entity in the CKG are linked by the relation from the CKG.

The method may comprise determining a first similarity between the first vector and the third vector. The method may comprise determining a second similarity between the second vector and the fourth vector.

In the example, the relation from the CKG is selected to relate the first entity in the SG to the second entity in the SG, if the first similarity is beyond a threshold and the second similarity is beyond a threshold. These thresholds may be user defined. The same threshold may be used for the first similarity and the second similarity. In the example, the first entity in the SG and the first entity in the CKG are considered similar, if the first similarity is beyond the threshold for the first similarity. This information may be reused e.g. when assessing whether to relate a pair of entities of the SG comprising the first entity and another entity of the SG with a relation of the CKG that relates the first entity of the CKG to another entity of the CKG that is found to be similar to the other entity of the SG from the pair. In the example, the second entity in the SG and the second entity in the CKG are considered similar, if the second similarity is beyond the threshold for the second similarity. This information may be reused e.g. when assessing whether to relate a pair of entities of the SG comprising the second entity and another entity of the SG with a relation of the CKG that relates the second entity of the CKG to another entity of the CKG that is found to be similar to the other entity of the SG from the pair.

The first similarity and/or the second similarity may be a word-based semantic similarity. The first similarity and/or the second similarity may be a cosine similarity between vectors.

This means, the method comprises relating entities representing object classes in the SG with relations of the CKG. The relations of the CKG represent common sense information.

This way, from the set of images, an enhanced SG is determined, which incorporates both visual information and contextual information about scenes that are detected in at least a part of the set of images.

In the example, the method comprises relating the entity representing the object class car in the SG and the entity representing the object class bicycle in the SG with the relation indicating "is faster than" from the CKG.

In the example, the method comprises relating the entity representing the object class scooter in the SG and the entity representing the object class bicycle in the SG with the relation indicating "is faster than" from the CKG.

Afterwards, a step 308 is executed.

In the step 308, entities in the SG are clustered.

In the example, the method comprises selecting target entities from the entities in the SG. For example, those entities in the SG that represent the scenes are selected as target entities.

The clustering of these entities may comprise the following steps:

Translating the SG into vectors in a low-dimensional vector space. In the example, a KGE of the SG that results from the previous steps may be determined.

Clustering the target entities in the vector space. Clustering the target entities may comprise providing a number of clusters that shall result from the clustering. The clustering may be performed with a clustering method, e.g. the multicut clustering algorithm or k-means algorithm. Any other clustering method that is based on a given number of clusters may be used.

Afterwards, a step 310 is executed.

The step 310 comprises representing the obtained clusters using relations. These relations may be relations labeled with a predicate, e.g. "belongsTo".

These relations, that relate the scene with the cluster, are determined depending on at least one feature of digital image data representing the scene.

Representing the obtained clusters is described below for a triple comprising an entity of the SG and an entity representing a cluster and a relation labeled with the predicate, e.g. "belongsTo". The entity representing the cluster may be one of the target entities.

The same method is used for relating the other entities to this or of another cluster according to the result of clustering the target entities.

The method may comprise adding this triple to the SG. In the example, the triple comprising the two entities of the SG and the relation labeled with the predicate are stored in the SG. This means, information about the cluster is integrated into the SG. Instead of storing in the SG, another KG may be determined that comprises the SG and the triple.

In the example, a set of clusters is determined. The clusters in the example group entities based on their semantic similarity, and the corresponding labels are then computed for the resulting groups. The semantic labels in the example comprise the relations of the CKG that relate pairs of entities representing object classes for objects that are detected in the clustered scenes. These clusters can be used for various applications.

The two exemplary scenes that comprise the car and the scooter respectively are clustered together because of the common property of being faster than a bicycle.

Afterwards, a step 312 is executed.

In the step 312, the method comprises learning at least one rule. Rule induction is used in the example to determine the rules.

Learning the at least one rule is described by way of an example of one rule. Other rules may be learned with the same method.

The rule may comprise a head and a body. The head may comprise a head relation that relates an entity representing a scene to an entity representing a cluster. The body may comprise a predicate or a conjunction of predicates. A predicate may comprise a relation that relates a first entity to a second entity. The entities in the example are entities of the SG. The relation in the example is selected from the SG that is enhanced with the additional relations that are determined from the CKG. In the example, the rule is determined over previously determined triples.

The conjunction of predicates in the body of the rule may comprise a predicate that is a relation that represents commonsense information that was added to the SG from the CKG.

For the two exemplary scenes, that comprise the car and the scooter, a rule may be learned that explain, that these scenes are clustered together because of the common property of being faster than a bicycle. For the two exemplary scenes, that comprise the car and the scooter, the rule head comprises a relation that relates any scene for that the rule body is true to an entity representing a predetermined cluster. In the example, the entity representing the object of the object type "car" is related to the scene comprising the car. In the example, the entity representing the object of the object type "scooter" is related to the scene comprising the scooter. The entities representing the object class "car" and the object class "scooter" are in the example both related to the entity representing the object class "bicycle" with the relation from the CKG that indicates that these are faster than the bicycle. The rule is thus determined to be true for both cases. The rule body thus comprises a conjunction of predicates that is true for any scene that comprises an object of an object class that has the property of being faster than a bicycle. A rule for explaining a scene X that includes an object Y of an object class Z1 and an object class Z2 that is learned for a the cluster c from the object classes "car" and "scooter" may be:

$$belongsTo(c,X) \leftarrow includes(X,Y), type(Y,Z1), is\ faster\ than(Z1,Z2)$$

This rule represents a description, in particular a semantic description, for the computed clusters.

For other clusters, the rules represent explanations reflecting reasons why certain scenes have been grouped together. These explanations are useful, e.g., for facilitating semantic search over a large collections of scene images.

Afterwards, a step 314 is executed.

In step 314, the set of clusters is output and/or used along with the rules, i.e. their descriptions.

Optionally, the technical system, e.g. the vehicle, is controlled depending on the result of clustering. The result of the clustering may be determined from the set of images that is captured by the vehicle.

For example, a conjunctive query is received in a step 316. The conjunctive query may be received from the at least one controller 112 of the vehicle.

Afterwards a semantic search over the set of clusters and their description is performed in a step 318 to identify a scenario based on the conjunctive query. The scenario may be a scenario in which the vehicle operates. The explanations in the rules may be used to facilitate the semantic search. A result of the semantic search, e.g. the identified scenario, may be used by the controller 112 to control the vehicle in a step 320.

The main advancement of this method for scene clustering concerns the following two aspects.

First, the problem of clustering is performed in a semantically rich domain as opposed to purely visual domain.

This is achieved by constructing the additional triples on which the clustering operates.

Second, the method produces in the output not only clusters but also semantic labels for them. This is due to the fact that instead of clustering images based on their low-level features, the method instead performs explainable embedding-based clustering on the triples derived from the SG based on the low-level features of images in the set of images and common sense information from the CKG.

The embeddings, i.e. vectors, for entities in the SG that represent scenes are determined based on the low-level features of digital images. The clusters into which the scenes are clustered are determined depending on the low-level feature based embeddings representing the scenes. The commonsense information from the CKG is used to learn the rules that explain why scenes are clustered in the way they are clustered.

Other applications are as follows:

1. Training data generation, e.g. for automated driving, AD: The method may be used for the generation of labels for the driving scenes that can be subsequently exploited for supervised training of models in the AD context.

The method may comprise generating the training data for automated driving.

Generating training data may comprise generating a label for the scene depending on the relation that relates the scene with the cluster or depending on the rule for this scene cluster relation.

2. Semantic image search and exploration: The method is able to create semantic clusters of images with descriptions for them that do not only capture the visual objects appearing in the images, but also expand a label space with commonsense concepts. This facilitates an image search process, where given a set of keywords provided by a user and a goal is to retrieve images that semantically match the specified keywords.

The method may comprise generating a data structure for the scene. The data structure may comprise a dimension for the second relation, and a dimension for the rule.

What is claimed is:

1. A computer implemented method for explainable clustering of a scene, the method comprising the following steps:
   identifying objects in the scene, the objects including a first object that belongs to a first object class and a second object that belongs to a second object class;
   based on the identification of the objects, identifying, in a first knowledge graph, a pair of entities that respectively correspond to the first and second object classes, wherein the first knowledge graph is a scene-independent commonsense knowledge graph that identifies a first relation, the first relation being a scene-independent relationship of how the pair of entities is related to each other without regard to the scene;
   clustering the scene into one of a plurality of scene clusters, the scene cluster into which the scene is clustered also including other scenes, wherein the clustering is performed based on commonalities between the scene and the other scenes determined at least partly using the first relation;
   based on the scene cluster into which the scene has been clustered, determining a second relation that relates one or more visual features of digital image data representing the scene to the scene cluster into which the scene has been clustered; and
   determining a rule that maps the first relation to the second relation.

2. The method according to claim 1, further comprising:
   capturing an image including the scene with a camera mounted to or monitoring a technical system, the technical system being a vehicle or a road infrastructure, wherein the clustering and/or the determining of the rule depends on the image.

3. The method according to claim 1, further comprising:
   generating training data for automated driving, wherein the generating of the training data includes generating a label for the scene depending on the second relation or depending on the rule that maps the first relation to the second relation.

4. The method of claim 1, further comprising:
   generating a scene graph representing the identified objects in the scene and representing a third relation that indicates how the identified objects relate to one another in the scene; and
   based on the identification of the pair of entities in the first knowledge graph, modifying the scene graph to incorporate the second relation, thereby forming an extended scene graph, wherein the clustering is based on the extended scene graph.

5. The method of claim 1, wherein the commonsense knowledge graph is domain-specific.

6. The method according to claim 1, wherein the determining of the first relation includes determining a first embedding that represents a first entity of the first knowledge graph, determining a second embedding that represents a second entity of the first knowledge graph, determining a third embedding that represents the first object class, determining a fourth embedding that represents the second object class, determining whether a similarity between the first embedding and the third embedding and a similarity between the second embedding and the fourth embedding meet a condition, and determining a constituency of the pair of entities based on whether the condition has been determined to have been met, such that the pair of entities includes the first embedding and the second embedding when the condition is met and includes at least one other entity of the first knowledge graph when the condition is not met.

7. The method according to claim 1, further comprising:
   relating an entity that represents the scene and an entity that represents the cluster in a second knowledge graph, the second knowledge graph being a scene graph.

8. The method according to claim 7, further comprising relating in the second knowledge graph a first entity that represents the first object class and a second entity that represents the second object class with the first relation.

9. The method according to claim 7, wherein the determining of the rule that maps the first relation to the second relation is based on relations of the second knowledge graph.

10. The method according to claim 1, further comprising:
    generating a data structure for the scene, wherein the data structure includes a dimension for the second relation and a dimension for the rule.

11. The method according to claim 1, wherein the first relation is one of a plurality of first relations, the second relation is one of a plurality of second relations, and the rule is one of a plurality of rules that each maps a respective one of the plurality of first relations to a respective one of the second relations, the method further comprising:
- in response to a conjunctive query from a controller of a technical system, using the plurality of rules to execute a semantic search for one or more scenes obtained from a set of clusters including the cluster into which the scene has been clustered to provide a result of the conjunctive query; and
- controlling the technical system with the controller depending on the result.

12. A device for explainable scene clustering of a scene, comprising:
- at least one processor; and
- at least one storage;
- wherein the device is configured to:
  - identify objects in the scene, the objects including a first object that belongs to a first object class and a second object that belongs to a second object class;
  - based on the identification of the objects, identify, in a first knowledge graph in the at least one storage, a pair of entities that respectively correspond to the first and second object classes, wherein the first knowledge graph is a scene-independent commonsense knowledge graph that identifies a first relation, the first relation being a scene-independent relationship of how the pair of entities is related to each other without regard to the scene;
  - cluster the scene into one of a plurality of scene clusters in the at least one storage, the scene cluster into which the scene is clustered also including other scenes, wherein the clustering is performed based on commonalities between the scene and the other scenes determined at least partly using the first relation;
  - based on the scene cluster into which the scene has been clustered, determine a second relation that relates one or more visual features of digital image data representing the scene to the scene cluster into which the scene has been clustered; and
  - determine, and store in the at least one storage, a rule that maps the first relation to the second relation.

13. The device according to claim 12, wherein the first relation is one of a plurality of first relations, the second relation is one of a plurality of second relations, the rule is one of a plurality of rules that each maps a respective one of the plurality of first relations to a respective one of the second relations, and the device is further configured to:
- in response to a conjunctive query from a controller of a technical system, use the plurality of rules to execute a semantic search for one or more scenes obtained from a set of clusters including the cluster into which the scene has been clustered to provide a result of the conjunctive query; and
- control the technical system with the controller depending on the result.

14. A non-transitory computer-readable medium on which is stored a computer program including computer readable instructions for explainable clustering of a scene, the instructions, when executed by a computer, causing the computer to perform the following steps:
- identifying objects in the scene, the objects including a first object that belongs to a first object class and a second object that belongs to a second object class;
- based on the identification of the objects, identifying, in a first knowledge graph, a pair of entities that respectively correspond to the first and second object classes, wherein the first knowledge graph is a scene-independent commonsense knowledge graph that identifies a first relation, the first relation being a scene-independent relationship of how the pair of entities is related to each other without regard to the scene;
- clustering the scene into one of a plurality of scene clusters, the scene cluster into which the scene is clustered also including other scenes, wherein the clustering is performed based on commonalities between the scene and the other scenes determined at least partly using the first relation;
- based on the scene cluster into which the scene has been clustered, determining a second relation that relates one or more visual features of digital image data representing the scene to the scene cluster into which the scene has been clustered; and
- determining a rule that maps the first relation to the second relation.

15. A computer implemented method for explainable clustering of a scene, the method comprising the following steps:
- determining a first relation that relates a first object class to a second object class, the determining of the first relation including determining, depending on the first object class and the second object class, a pair of entities in a first knowledge graph, the first knowledge graph being a commonsense knowledge graph that represents information about a domain, wherein the pair of entities is related with the first relation in the first knowledge graph;
- determining a cluster to which the scene belongs depending on the scene and depending on other scenes;
- determining a second relation that relates the scene with the cluster depending on at least one feature of digital image data representing the scene; and
- determining a rule that maps the first relation to the second relation;
- wherein the method includes at least one of the following four features (I)-(IV):
  - (I) the determining of the first relation includes determining a first embedding that represents a first entity of the first knowledge graph, determining a second embedding that represents a second entity of the first knowledge graph, determining a third embedding that represents the first object class, determining a fourth embedding that represents the second object class, determining whether a similarity between the first embedding and the third embedding and a similarity between the second embedding and the fourth embedding meet a condition, and determining a constituency of the pair of entities based on whether the condition is determined to have been met, such that the pair of entities includes the first embedding and the second embedding when the condition is met and includes at least one other entity of the first knowledge graph when the condition is not met;
  - (II) the method further comprises relating an entity that represents the scene and an entity that represents the cluster in a second knowledge graph, the second knowledge graph being a scene graph;
  - (III) the method further comprises generating for the scene a data structure that includes a dimension for the second relation and a dimension for the rule; and (IV) the first relation is one of a plurality of first relations, the second relation is one of a plurality of second relations, the rule is one of a plurality of rules that each maps a respective one of the first relations to a respective one of the second relations, and the method further comprises (i) in response to a conjunctive query from a controller of a technical system, using the plurality of rules to execute a semantic search of a set of clusters for a result to the conjunctive query, the set of clusters including the cluster to which the scene belongs, and (ii) controlling the technical system with the controller depending on the result.

16. The method according to claim 15, wherein the determining of the first relation includes the determining of the first embedding that represents the first entity of the first knowledge graph, the determining of the second embedding that represents the second entity of the first knowledge graph, the determining of the third embedding that represents the first object class, the determining of the fourth embedding that represents the second object class, the determining of whether the similarity between the first embedding and the third embedding and the similarity between the second embedding and the fourth embedding meet the condition, and the determining of the constituency of the pair of entities based on whether the condition is determined to have been met, such that the pair of entities includes the first embedding and the second embedding when the condition is met and includes at least one other entity of the first knowledge graph when the condition is not met.

17. The method according to claim 15, wherein the method further comprises the relating of the entity that represents the scene and the entity that represents the cluster in the second knowledge graph, the second knowledge graph being the scene graph.

18. The method according to claim 17, wherein the determining of the first relation includes relating in the second knowledge graph a first entity that represents the first object class and a second entity that represents the second object class with the first relation.

19. The method according to claim 17, wherein the determining of the rule that maps the first relation to the second relation is performed based on relations of the second knowledge graph.

20. The method according to claim 15, wherein the method further comprises the generating of the data structure for the scene, and the data structure includes the dimension for the second relation and the dimension for the rule.

21. The method according to claim 15, wherein:
the first relation is one of a plurality of first relations;
the second relation is one of a plurality of second relations;
the rule is one of a plurality of rules that each maps a respective one of the first relations to a respective one of the second relations; and
the method further comprises:
  in response to the conjunctive query from the controller of the technical system, the using of the plurality of rules to execute the semantic search of the set of clusters for the result to the conjunctive query, the set of clusters including the cluster to which the scene belongs; and
  the controlling of the technical system with the controller depending on the result.

\* \* \* \* \*